United States Patent [19]

Moscovitch

[11] Patent Number: 5,319,210
[45] Date of Patent: Jun. 7, 1994

[54] NEUTRON DOSIMETRY USING THREE-DIMENSIONAL OPTICAL MEMORY

[75] Inventor: Marko Moscovitch, Potomac, Md.

[73] Assignee: Georgetown University, Washington, D.C.

[21] Appl. No.: 974,207

[22] Filed: Nov. 10, 1992

[51] Int. Cl.$^5$ .............................................. G01T 1/00
[52] U.S. Cl. .............................. 250/474.1; 250/472.1; 250/473.1; 360/127
[58] Field of Search ....................... 365/119, 106, 127; 250/474.1, 473.1, 472.1

[56] References Cited

U.S. PATENT DOCUMENTS

| | | | |
|---|---|---|---|
| 4,288,861 | 9/1981 | Swainson et al. | 365/127 |
| 4,983,843 | 1/1991 | Thomson | 250/370.02 |

OTHER PUBLICATIONS

William L. McLaughlin, "VI: Films, Dyes, and Photographic Systems." in *Manual on Radiation Dosimetry*, N. W. Holm and R. J. Berry, editors (Marcel Dekker, Inc., New York, 1970) pp. 129–177.

R. M. MacFarlane, "Photon-Gated Spectral Holeburning" *Journal of Luminescence* 38 (1987).

Robert C. Bertelson, "Photochronic Process Involving Heterolytic Cleavage" in *Techniques of Chemistry* vol. III, Photochromism (Wiley-Interscience, New York, 1971) pp. 45–55, 242–255.

Moscovitch, "Dosimeters For Measuring Neutron Dose Equivalent: New Approaches", Invited Paper. In The *Proceedings Of The Eleventh DOE Workshop On Personnel Neutron Doismetry*, Las Vegas, Nev., Jun. 4–7, 1991.

Griffith, "Review Of The State Of The Art In Personnel Neutron Monitoring With Solid State Detectors", *Radiation Protection Dosimetry*, vol. 23, No. 114, pp. 155–160 (1988).

Lund et al., "Neutron Dosimeter Using A Dynamic Random Access Memory As A Sensor", *IEEE Transactions on Nuclear Science*, vo. 33, No. 1, (1986).

Davis, "Use of Computer Memory Chips As The Basis For A Digital Albedo Neutron Dosimeter", *Health Physics*, vol. 49, No. 2 (1985).

Hunter et al., "Potentials of two-photon based 3-D optical memories for high performance computing," *Applied Optics*, vol. 29, No. 14, May 10, 1990.

Hankins et al., "Preliminary Study On The Use Of The Track Size Distribution On Electrochemically Etched R-39 Foils To Infer Neutron Spectra", *Radiation Protection Dosimetry*, vol. 20, No. 1/2, pp. 109–112, (1987).

Parthenopoulos et al., "Three-Dimensional Optical Storage Memory, Department of Chemistry", *Science*, vol. 245 (1989).

Stein, "Terabyte Memories with the Speed of Light", *BYTE* (1992).

Bolch et al., "A Method Of Obtaining Neutron Dose And Dose Equivalent From Digital Measurements And Analysis Of Recoil-Particle Tracks", *Health Physics*, vol. 53, No. 3, pp. 241–253, 1987.

*Primary Examiner*—Constantine Hannaher
*Attorney, Agent, or Firm*—Renner, Otto, Boisselle & Sklar

[57] ABSTRACT

A dosimetry method, dosimeter and system characterized by the steps of storing information in a three dimensional optical memory element, then exposing the optical memory element to neutron or other high LET radiation to alter the information stored in the optical memory element as a function of the radiation to which the optical memory element is exposed, and then retrieving the altered information from the optical memory element for subsequent analysis. The altered information is used to provide a measure of both the radiation dose and energy. In a preferred embodiment, the optical memory device is a 3-D ORAM comprising a volume of a transparent polymer doped with a light sensitive chemical and, in particular, spirobenzopyran.

21 Claims, 1 Drawing Sheet

NEUTRON DOSIMETRY USING THREE-DIMENSIONAL OPTICAL MEMORY

The invention herein described relates generally to radiation dosimetry and, more particularly, to a neutron dosimeter and associated dosimetry method that allows precise neutron dose measurements. The invention also has application to other types of high linear energy transfer (LET) radiation such as protons, heavy ions, etc. and to microdosimetry.

BACKGROUND

The fraction of radiation dose from neutrons received by radiation workers is increasing as a result of growth in the nuclear power industry, the development of nuclear reactor technology, and the potential use of neutrons for radiotherapy. Unfortunately, neutron dosimetry has been a difficult problem due to low neutron sensitivity and energy dependence of existing dosimetry methods. Prior art neutron dosimetry methods include thermoluminescence dosimetry (TLD), solid track detector methods using, for example, electrochemically etched CR-39 foil or NTA film, and fluid track detector methods using, for example, superheated bubble detectors (SSD).

The foregoing methods may not have the energy response and sensitivity necessary to meet the more exacting needs of neutron dosimetry. TLD suffers from high energy dependence, which may result in an error of as much as a factor of ten or more if the neutron energy spectrum is not known. NTA films have response functions that may cause even greater errors for many operational situations. Major unaddressed problems with CR-39 are the lack of sensitivity at low neutron energies, energy dependence and poor sensitivity at high energies. The more recently developed superheated drop detector has been shown to suffer from serious drawbacks including a fourfold reduction in the energy response at energies from 0.144 MeV to 5 MeV.

Other neutron dosimetry methods that have been proposed rely on electrical property changes, such as soft errors which arise in dynamic random access memories (DRAMs) through interaction with charged particles, particularly, alpha particles. For use as a neutron dosimeter, a converter is used to interact with the neutrons and generate protons or alpha particles. Accordingly, the overall performance of the neutron dosimeter is at least in part dependent on the performance of the converter which may be a foil layer applied to the DRAM. Moreover, a neutron/alpha converter has the disadvantage of increasing the dosimeter size and complicating the dose reading interpretation. In addition to the need for a converter, the material of the DRAMs is not tissue equivalent and there still remains the problem of energy dependence.

Neutron dosimetry is recognized as being a difficult problem in health physics. Recently there has been a reevaluation of the biological hazards associated with neutron exposure and, consequently, there is an urgent need for a neutron dosimetry method that provides precise neutron dose measurement over a wide range of neutron energies. More particularly, a need exists for a neutron dosimeter and dosimetry method that solves the two major unsolved problems of neutron dosimetry: (1) inability to measure the neutron energy which results in errors in estimating the dose equivalent and (2) poor sensitivity at high and low neutron energies. There is needed a neutron dosimeter that is sensitive at both high and low energies and is capable of characterizing the exposure energy spectrum, thereby to permit accurate neutron dose measurements.

SUMMARY OF THE INVENTION

The present invention satisfies the aforesaid need by taking an entirely new approach to neutron, and more generally high LET radiation, dosimetry that is characterized by the use of a optical memory device composed of a volume of material containing a photoactive substance wherein an energy induced three-dimensional inhomogeneity pattern may be produced and/or detected optically as by use of directed electromagnetic radiation. More particularly, the invention uses a two photon based, three-dimensional optical random access memory (3-D ORAM) that heretofore has been proposed as a memory device for computers wherein massive quantities, such as many gigabytes, of data is to be stored. The 3-D ORAM is a volume, typically a cube, of transparent polymer doped with a light sensitive chemical that can be written and read using two laser beams that simultaneously strike the material to alter at their intersection an optical characteristic of the material.

According to the invention, a dosimetry method comprises the steps of storing information in a three dimensional optical memory element, then exposing the optical memory element to neutron or other high LET radiation to alter the information stored in the optical memory element as a function of the radiation to which the optical memory element is exposed, and then retrieving the altered information from the optical memory element for subsequent analysis. More particularly, certain information is written on the optical memory element, which information becomes altered by exposure to the radiation. The altered information is later read from the optical memory and analyzed to provide a measure of both the radiation dose and energy.

In a preferred embodiment, the optical memory device is a 3-D ORAM comprising a volume of a transparent polymer doped with a light sensitive chemical and, in particular, spirobenzopyran. Binary information is stored in the ORAM by excitation of the photochronic chemical dopant molecule to a higher energy state using laser light. When the molecule absorbs simultaneously two photons, an optical characteristic thereof, such as color, changes and records a bit.

When neutron radiation interacts with the hydrogen and carbon composing the ORAM material, it will create energetic heavy ions. Those heavy ions will cause a local energy deposition and the resultant localized temperature increase will cause the excited or "written" molecule or molecules in the vicinity to revert to their lower energy or "unwritten state". In computer memory terminology, the interaction with neutron radiation will cause an error or errors to occur in the form of a bit flip or flips, i.e., a change from a written binary "1" state to an unwritten "0" state. The number of "errors" or "bit flips" will be related to the neutron dose, and therefore the dose can be calculated. The local energy doposition will also occur from interaction with other types of high LET radiation such as proton and heavy ion radiation.

In addition, the energy of the absorbed radiation may be determined from the spatial distribution of the bit flips in that neutrons (or other high LET particles) of different energies will produce different track structures in the ORAM. An energy measurement can be made by relating the radiation energy spectrum to the track structure produced by the interactions with the hydrogen and carbon atoms composing the ORAM. Once the energy is known, energy dependent quality factors can be applied to provide dose equivalent.

The present invention enables a sensitivity many orders of magnitude greater than the sensitivity afforded by existing neutron dosimetry methods at both high and low energies. This arises from the high storage and interaction density of ORAM which is $10^{12}$ bits/cm$^3$. Furthermore, conventional ORAMs useful in practicing the invention are composed of hydrogen and carbon atoms. This provides tissue equivalence while at the same time eliminating the need for, and the drawbacks associated with, an external alpha or proton radiator that heretofore was employed in neutron dosimetry. The present invention also is useful in practicing microdosimetry.

According to another aspect of the invention, there is provided a high LET dosimeter comprising a dosimeter element and a holder for said dosimeter element. The dosimeter element is formed by an optical memory device and the holder includes means whereby the holder may be worn by a person whose radiation dose exposure is to be monitored. In a preferred embodiment, the dosimeter element is removable from the holder so that it may be "read" in a reader intended for this purpose.

According to yet another aspect of the invention, there is provided a dosimetry reader comprising means for removably receiving an optical memory element that has been exposed to high LET radiation, means for retrieving information from the optical memory element, and means for analyzing the information retrieved from the optical memory element to provide a measure of radiation dose and/or energy.

According to a further aspect of the invention, there is provided a neutron dosimeter system comprising a neutron dosimeter including an optical memory device for exposure to neutron radiation, a reader for retrieving information from the optical memory device after exposure to neutron radiation, and means for analyzing the retrieved information to provide a measure of neutron radiation dose and/or neutron energy.

According to still another aspect of the invention, there is provided a method for monitoring ionizing radiation exposure comprising the steps of storing information in a three dimensional optical memory element, then exposing the optical memory element to ionizing radiation to alter the information stored in the optical memory element as a function of the radiation to which the optical memory element is exposed, retrieving the altered information from the optical memory element, and analyzing the altered information retrieved from the optical memory element to extract radiation exposure information therefrom.

According to yet another aspect of the invention, there is provided a method of performing microdosimetry comprising the steps of storing information in a three dimensional optical memory element, then exposing the optical memory element to radiation to alter the information stored at a plurality of memory locations in the optical memory element through local interaction with the radiation to which the optical memory element is exposed, and retrieving the altered information from the optical memory element by reading the memory locations to determine the location of the memory locations that have been altered through local interaction with the radiation thereby to obtain a measure of the spatial distribution of radiation dose within the optical memory element.

The foregoing and other features are hereinafter described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION

The neutron dosimetry method of the invention uses as a dosimeter an optical memory element composed of a volume of material containing a photoactive substance wherein an energy induced three-dimensional inhomogeneity pattern may be produced and/or detected optically as by use of directed electromagnetic radiation. The method generally comprises the steps of storing information in a three dimensional optical memory element, then exposing the optical memory element to neutron radiation to alter the information stored in the optical memory element as a function of neutron radiation to which the optical memory element is exposed, and then retrieving the altered information from the optical memory element for subsequent analysis. The steps are more fully described below as are details of a preferred optical memory element, devices and system useful in practicing the method.

A preferred optical memory element useful as a neutron dosimeter is a three dimensional optical random access memory (3-D ORAM) of the type previously proposed for use as a memory storage device in computers. A known 3-D ORAM is composed of a transparent polymer doped with a light sensitive chemical called spirobenzopyran. The spirobenzopyran molecules embedded in the polymer matrix have two isometric forms that change from one to the other in response to energy level changes stimulated by electromagnetic energy. 3-D ORAM elements composed of spirobenzopyran embedded in a polymer matrix may be obtained from the University of California, Irvine, Calif., where the 3-D ORAM was developed as reported in Parthenopoulos and Rentzepis, "Three-Dimensional Optical Storage Memory", Science, Vol. 245, 843-845 (1989). The spirobenzopyran molecule and its major properties are described in Bertelson, *Techniques of Chemistry: Photochromism*, Vol. 3, Wiley-Interscience, New York, 1971, p. 45.

The storage and retrieval of meaningful information in and from the ORAM may be effected by using a Nd:YAG diode pumped solid state laser system to write and read information in a binary format provided by the two distinct forms of spirobenzopyran. The Nd:YAG laser produces both 532 nm and 1064 nm laser beams that are particularly useful in writing and reading the ORAM using two-photon absorption. Two-photon absorption is the excitation of a molecule to an electronic state of higher energy by the simultaneous absorption of two photons, and the physics thereof is further described in R. M. Macfarlane, J. Lumin, 38, 20 (1987).

Figure 1:
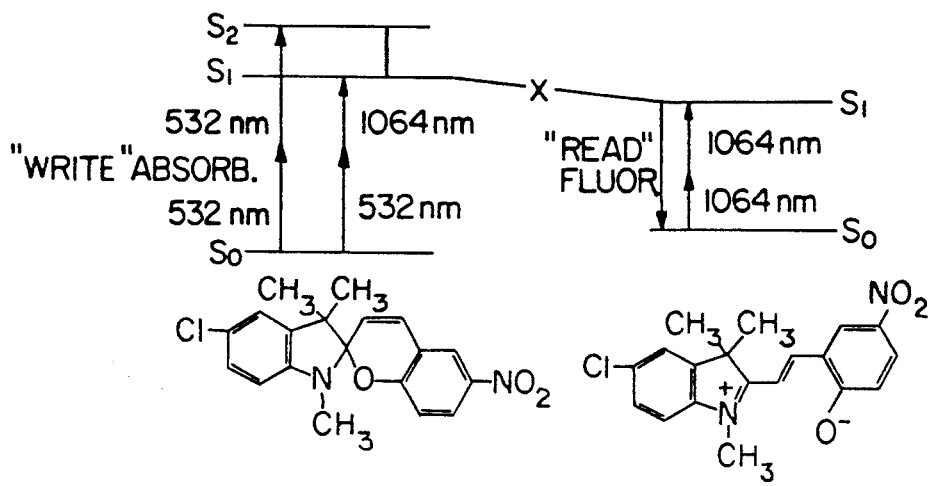
FIG. 1 (from Parthenopoulos and Rentzepis, Science, Vol. 245, 843) is an energy level diagram of the "write" and "read" forms of the spirobenzopyran molecule in a polymer matrix.

When the spirobenzopyran molecule absorbs simultaneously two 532 nm photons, it changes color and records a "bit". As illustrated in FIG. 1, the first photon provides excitation to an intermediate virtual state and the second photon further excites the molecule to a stable excited state. Since the virtual state is unstable, both photons must overlap in both space and time for a transition to occur. In binary logic, the form at the left may represent a "1" and the form at the right may represent a "0".

The read operation also relies on the simultaneous absorption of two photons, but the two photons are of longer wavelengths. Two 1064 nm photons can be used to simultaneously excite the spirobenzopyran molecules. Only the molecules that have been written will absorb the longer wavelengths and emit fluorescence that may be detected using a sensitive optical detector array.

Figure 2:
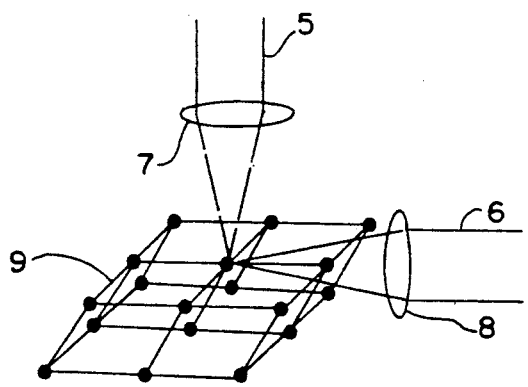
FIG. 2 (from Stein, Byte, March 1992, 168) is diagram showing a 3-D ORAM based on a two-photon process using two orthogonal laser beams.

Information may be written and read at selected locations within the ORAM by using two mutually orthogonal laser beams focussed to simultaneously excite an "addressed" molecule as depicted in FIG. 2. For writing a bit, two 532 nm beams 5 and 6 are focussed by focus elements 7 and 8 at the addressed location within the volume of the ORAM 9 thereby exciting the molecule to its higher energy state. For reading a bit, two 1064 nm beams are focussed at the addressed location and fluorescence is looked for to see if the addressed bit had been written. Erasing may be achieved by either light for erasing selected bits or by temperature for bulk erasure. As will be appreciated from the following description, erasure is not necessary as normally, for reuse, the entire ORAM is written to rejuvenate the ORAM for reuse as a neutron detector. Beam splitter and focussing optics may be used to provide the two laser beams that simultaneously strike the ORAM and write or read a bit at their intersection. For writing, it may prove to be preferable to use a weak 532 nm beam and a strong 1064 nm beam to avoid a potential complication arising from two-photon absorption being induced by each beam separately when two beams of equal wavelength are used.

Figure 3:
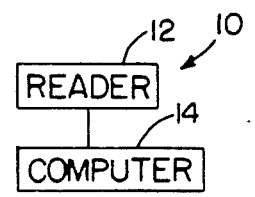
FIG. 3 is a diagrammatic illustration of a neutron dosimetry system according to the present invention.

For details of a system for writing and reading ORAM, reference may be had to Hunter et al., "Potentials of Two-Photon Based 3-D Optical Memories for High Performance Computing", *Applied Optics*, Vol. 29, No. 14, May 10, 1990, which is hereby incorporated herein by reference. The present invention may be practiced using any suitable hardware and associated software for implementing the herein described write and read functions. Moreover, the ORAM write/read equipment may have integrated therein or may be interfaced to a computer, such as a conventional programmable microcomputer, that performs the hereinafter discussed data analysis and control functions. FIG. 3 shows a representative system 10 including an ORAM dosimeter reader 12 and computer 14.

Figure 4:
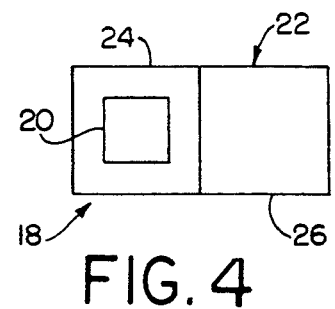
FIG. 4 is a diagrammatic illustration of a neutron dosimeter according to the invention.

According to the invention, an optical memory element, such as the above described ORAM, is used as the neutron sensitive element of a dosimeter 18. As diagrammatically depicted in FIG. 4, the ORAM 20 will typically be housed in a holder 22 for protection and to facilitate mounting at a monitoring site or wearing of the dosimeter on a person such as by clipping the holder to the user's clothes or by direct attachment to the user's body. The holder may be multi-component holder including, for example, a case 24 for the ORAM dosimeter element and a carrier 26 for the case. The case 24 should be opaque to light to avoid the possibility of non-neutron induced response in the ORAM dosimeter element. Depending on the nature of the hardware selected to write and read the dosimeter, the ORAM dosimeter element may need to be removable from the case and/or holder for placement in the write/read equipment. The carrier may include a clip or other attachment/wearing device.

The ORAM dosimeter element 20 is prepared for use by writing a bit at each memory location to be used for neutron dose monitoring. Preferably, all addressable memory locations are written to maximize the sensitivity of the ORAM. Once written the dosimeter element may be placed in the holder 22 and distributed or placed for monitoring exposure to neutrons. For example, the dosimeter may be worn by a person whose exposure to neutrons is to be monitored. The ORAM dosimeter will then be exposed to the same radiation as the person. After a prescribed period of time, the dosimeter is retrieved so that it may be read to extract therefrom radiation exposure information.

When neutron radiation interacts with the hydrogen and carbon composing the ORAM material, it will create energetic heavy ions. These heavy ions will cause an error to appear in the ORAM by local energy deposition in the vicinity of the exited molecule. The resulting temperature increase erases the written form of the molecule causing an error to occur in the form of bit flip (a change of "1" to "0"). The measurable number of errors will be a function of and in principle proportional to the neutron dose. Accordingly, the absorbed neutron dose can be calculated as a function of the number of measurable errors. Absorbed dose is the primary physical quantity used in radiation dosimetry (often referred to simply as dose). Absorbed dose is defined as the energy absorbed per unit mass from any kind of ionizing radiation in any kind of matter.

Figure 5:
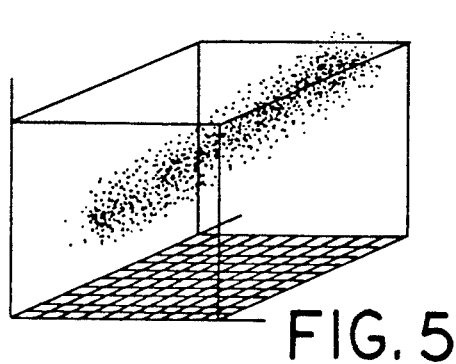
FIGS. 5 and 6 (from Bolch et al., *Health Physics*, Vol. 53, 245-246) are illustrations respectively showing simulated track structures produced by a 500 keV recoil proton and an 80 keV recoil C ion in gas.
Figure 6:
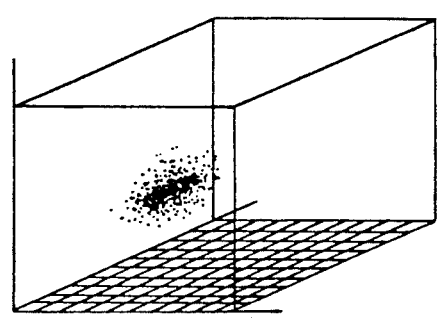

The neutron energy can be calculated from the structure of the ion tracks produced within the ORAM. By way of analogy, different recoil particles produce different track shapes in gas ionization chambers. FIGS. 5 and 6 show a significant difference in simulated track structure produced by a 500 keV recoil proton as compared to an 80 kev recoil C ion in gas. The distribution of the bit flips in the ORAM, and more particularly the bit-flip density distribution along the recoil charged particle tracks within the ORAM, will reveal the track structure distribution of the secondary charged particles produced by neutron interactions with the hydrogen and carbon atoms composing the ORAM. Accordingly, the functional relationship between the neutron energy and the spatial distribution of bit flips in the ORAM may be used to provide energy measurement. Once the energy is known, applying energy dependent quality factors provides the required dose equivalent. The quantity does equivalent is used to allow for different biological effectiveness of different kinds of radiation for radiation protection purposes. The dose equivalent H is defined as the product of the absorbed dose D and a dimensionless factor Q, which depends on the type of radiation. For gamma rays, X-rays, electrons and positrons, the value of the quality factor is 1. For neutrons and heavy charged particles the quality factor is in the range of 2-20 depending of the energy and type of particle.

Algorithm development for a given ORAM dosimeter element may be approached in a manner similar to the method described in Bolch et al., "A Method of Obtaining Neutron Dose and Dose Equivalent From Digital Measurements and Analysis of Recoil-Particle Tracks", *Health Physics*, 53, 241-253 (1987), which is hereby incorporated herein by reference. A suitable algorithm may calculate the track length L of the recoil event by considering the two cells most likely to contain the true endpoints of the track, and the average diameter R of the track by performing three-dimensional scanning for bit-flip events in the neighborhood of the track axis. R and L may then be used to unfold neutron dose equivalent using predetermined relationships.

As will be appreciated by the reader, an improved neutron sensitivity is achieved by several orders of magnitude taking advantage of the high storage density of ORAM on the order of $10^{12}$ bits/cm$^3$ as compared to the storage density of $10^8$ bits/cm$^3$ for a conventional silicon based DRAM suggested in the literature for thermal neutron dosimetry. Moreover, ORAM, being composed of hydrogen and carbon atoms required for neutron interactions, provides tissue equivalence while eliminating the need for an external alpha or proton radiator often employed in neutron dosimetry. Alpha or proton radiators have the disadvantage of increasing the dosimeter size and complicating the dose reading interpretation.

Other Applications

Although the invention as thus far described has been in relation to neutron dosimetry, the principles of the invention can be applied to other types of radiation and, in general, high linear energy transfer (LET) radiation such as protons, heavy ions, etc., and also to microdosimetry. As above discussed, neutron radiation interacts with the hydrogen and carbon of the ORAM material and creates energetic heavy ions which cause local energy deposition. This local energy doposition will also occur from interaction with other types of high LET radiation such as proton and heavy ion radiation.

In fact, the above described neutron dosimeter may require a filter to block high LET particles other than neutrons where their presence is of significance. For most dosimetric applications on earth this will normally not be a problem because protons and heavy ions typically will not be present in any significant quantity in most instances. The situation is different in space applications where high energy protons constitute the predominant form of high LET radiation.

Accordingly, the above described methodology, dosimeter and equipment can be used to perform high LET radiation dosimetry including, in particular, proton dosimetry. The only difference is that the incident radiation directly interacts with the ORAM material to effect localized heating rather than through creation of secondary particles that cause localized heating as in the case of neutrons. In either case, the resulting temperature increase erases the written form of the excited molecule causing a error to occur in the form of a bit flip as above described. Accordingly, the absorbed dose can be calculated as a function of the number of measurable errors. Also, the high LET radiation energy can be calculated from the structure of the high LET particle tracks produced within the ORAM. Moreover, the nature or specific form of these tracks may possibly be used to discriminate between different types of high LET radiation such as between protons and neutrons.

The invention can also be used to practice microdosimetry and, in doing so, overcomes a fundamental problem that plagued earlier microdosimetry techniques. Microscopic dosimetry measures the microscopic distribution of dose in an irradiated solid body. Knowledge of how a body absorbs radiation locally is important to research on the biological effects of absorbed radiation. A problem in the past was that measurements couldn't be made inside the solid body. Because of this, researchers would use computer simulations or look at local effects in a gas and then extrapolate then to a solid body.

The present invention enables measurement of the distribution of dose inside a solid and, in particular, a solid that is tissue equivalent. The radiation induced "errors" can be read and mapped to provide a three-dimensional picture of the radiation distribution inside the ORAM.

Although the invention has been shown and described with respect to certain preferred embodiments, equivalent alterations and modifications will no doubt occur to others skilled in the art upon the reading and understanding of this specification. The present invention includes all such equivalent alterations and modifications, and is limited only by the scope of the following claims.

What is claimed is:

1. A high LET radiation dosimetry method comprising the steps of
    storing information in a three dimensional optical memory element,
    then exposing the optical memory element to high LET radiation to alter the information stored in the optical memory element as a function of the radiation to which the optical memory element is exposed, and
    then retrieving the altered information from the optical memory element for subsequent analysis.

2. A method as set forth in claim 1, wherein the optical memory element comprises a volume of a transparent polymer doped with a light sensitive chemical dopant molecule.

3. A method as set forth in claim 2, wherein the light sensitive chemical dopant is spirobenzopyran.

4. A method as set forty in claim 1, wherein said optical memory device is substantially composed of hydrogen and carbon.

5. A method as set forth in claim 1, wherein the optical memory element has a plurality of memory locations that may be written from a lower energy state to a higher energy state, the storing step includes exciting the memory locations from their lower energy state to the higher energy state, and the exposing step includes reversion of the excited memory locations from their higher energy state to their lower energy state through localized interactions between the radiation and molecules composing the optical memory element.

6. A method as set forth in claim 5, comprising the step of analyzing the altered information retrieved from the optical memory element to extract radiation dose information therefrom.

7. A method as set forth in claim 6, wherein the retrieving step includes reading the memory locations to determined the number of the memory locations that have reverted to their energy state, and the analyzing step includes determining the radiation dose as a function of the number of the memory locations that have reverted to their lower energy level.

8. A method as set forth in claim 5, wherein the retrieving step includes using two-photon absorption to read the memory locations.

9. A method as set forth in claim 5, wherein the storing step includes using two-photon absorption to write the memory locations by exciting them to their higher energy level.

10. A method as set forth in claim 1, wherein said high LET radiation is neutron radiation.

11. A method as set forth in claim 1, wherein said high LET radiation is proton radiation.

12. A high LET radiation dosimetry method comprising the steps of
storing information in a three dimensional optical memory element, the optical memory element having a plurality of memory locations that may be written from a lower energy state to a higher energy state, and the storing step including exciting the memory locations from their lower energy state to the higher energy state;
then exposing the optical memory element to high LET radiation to alter the information stored in the optical memory element as a function of the radiation to which the optical memory element is exposed, the exposing step including reversion of the excited memory locations from their higher energy state to their lower energy state through localized interactions between the radiation and molecules composing the optical memory element;
then retrieving the altered information from the optical memory element for subsequent analysis, the retrieving step including reading the memory locations to determine the number of the memory locations that have reverted to their lower energy state; and
then analyzing the altered information retrieved from the optical memory element to extract radiation dose information therefrom, the analyzing step including determining the radiation dose as a function of the number of the memory locations that have reverted to their lower energy level; and
wherein the retrieving step includes reading the memory locations to determine the spatial distribution of the memory locations that have reverted to their lower energy state, and the analyzing step includes determining the radiation energy as a function of the spatial distribution of the memory locations that have reverted to their lower energy state.

13. A high LET radiation dosimetry method comprising the steps of
storing information in a three dimensional optical memory element, the optical memory element having a plurality of memory locations that may be written from a lower energy state to a higher energy state, and the storing step including exciting the memory locations from their lower energy state to the higher energy state;
then exposing the optical memory element to high LET radiation to alter the information stored in the optical memory element as a function of the radiation to which the optical memory element is exposed, the exposing step including reversion of the excited memory locations form their higher energy state to their lower energy state through localized interactions between the radiation and molecules composing the optical memory element;
then retrieving the altered information from the optical memory element for subsequent analysis; and
then analyzing the altered information retrieved from the optical memory element to extract radiation dose information therefrom; and
wherein the retrieving step includes reading the memory locations to determine the spatial distribution of the memory locations that have reverted to their lower energy state, and the analyzing step includes determining the radiation energy as a function of the spatial distribution of the memory locations that have reverted to their lower energy state.

14. A high LET radiation dosimeter comprising a dosimeter element and a holder for said dosimeter element, the dosimeter element being formed by an optical memory device and the holder including means whereby the holder may be worn by a person whose radiation dose exposure is to be monitored.

15. A dosimeter as set forth in claim 14, wherein said dosimeter element is removable from the holder for reading in a ORAM reader.

16. A dosimeter reader comprising means for removably receiving an optical memory element that has been exposed to high LET radiation, means for retrieving information from the optical memory element, and means for analyzing the information retrieved from the optical memory element to provide a measure of radiation dose.

17. A dosimeter reader comprising means for removably receiving an optical memory element that has been exposed to high LET radiation, means for retrieving information from the optical memory element, and means for analyzing the information retrieved from the optical memory element to provide a measure of radiation dose, and wherein said means for analyzing includes means for determining both radiation dose and energy.

18. A dosimeter system comprising a high LET radiation dosimeter including an optical memory device for exposure to high LET radiation, a ORAM reader for retrieving information from the optical memory device after exposure to the radiation, and means for analyzing the retrieved information to provide a measure of radiation dose.

19. A dosimeter system comprising a high LET radiation dosimeter including an optical memory device for exposure to high LET radiation, an ORAM reader for retrieving information from the optical memory device after exposure to the radiation, means for analyzing the retrieved information to provide a measure of radiation dose and a measure of the energy of the radiation.

20. A method for monitoring exposure to ionizing radiation comprising the steps of
storing information in a three dimensional optical memory element,
then exposing the optical memory element to ionizing radiation to alter the information stored in the optical memory element as a function of the radiation to which the optical memory element is exposed, retrieving the altered information from the optical memory element, and analyzing the altered information retrieved from the optical memory element to extract radiation exposure information therefrom.

21. A method of performing microdosimetry comprising the steps of storing information in a three dimensional optical memory element, then exposing the optical memory element to radiation to alter the information stored at a plurality of memory locations in the optical memory element through local interaction with the radiation to which the optical memory element is exposed, and retrieving the altered information from the optical memory element by reading the memory locations to determine the location of the memory locations that have been altered through local interaction with the radiation thereby to obtain a measure of the spatial distribution of radiation dose within the optical memory element.

* * * * *

UNITED STATES PATENT AND TRADEMARK OFFICE
CERTIFICATE OF CORRECTION

PATENT NO. : 5,319,210
DATED : June 7, 1994
INVENTOR(S) : Marko Moscovitch

It is certified that error appears in the above-indentified patent and that said Letters Patent is hereby corrected as shown below:

column 9, line 5, please delete "determined" and insert therefor --determine--; and
column 9, line 6 before "energy" please insert --lower--.

Signed and Sealed this

Twenty-first Day of February, 1995

Attest:

BRUCE LEHMAN

Attesting Officer  Commissioner of Patents and Trademarks